J. R. Leschot.
Rock Drill.
No. 39,235. Patented Jul. 14. 1863.
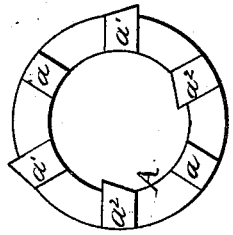
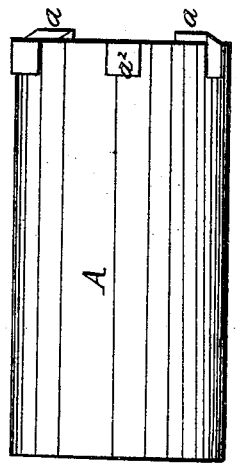
Witnesses:
J. W. Coombs
G. W. Reed
Inventor:
J. R. Leschot
per Munn & Co
Attorneys

UNITED STATES PATENT OFFICE.

RODOLPHE LESCHOT, OF PARIS, FRANCE.

TOOL FOR BORING ROCK.

Specification forming part of Letters Patent No. 39,235, dated July 14, 1863.

*To all whom it may concern:*

Be it known that I, RODOLPHE LESCHOT, of Paris, in the Empire of France, have invented a new and Improved Tool for Boring and Cutting Rock, Stone, and other Hard Substances; and I do hereby declare that the following is a full, clear, and exact description of the same, reference being had to the accompanying drawings, forming part of this specification, in which—

Figure 1 is a front view of the tool, and Fig. 2 is a side view of the same.

Similar letters of reference indicate corresponding parts in both figures.

Heretofore the boring of rock has been generally accomplished by the use of a chisel, punch, or boring-bar operated by percussion.

This invention consists in a boring-tool composed of a series of diamond edges attached to an annular or tubular stock or crown of steel or other metal, to which a rotary and a direct forward motion are given, and which is thereby caused to cut or bore an annular groove or hole, leaving a central core or kernel, which is easily detached by the subsequent operation of a gad or wedge, the quantity of matter required to be removed by such boring-tool being very small in proportion to the cavity which is formed after the withdrawal of the said kernel or core.

The advantage of this boring-tool is that it may be operated with a small amount of power, is expeditious in its action, and its wear is almost imperceptible in operating on the hardest substances.

To enable others skilled in the art to make and use my invention, I will proceed to describe it with reference to the drawings.

A is the annular or tubular socket or crown of steel or other metal, and $a$ $a'$ $a^2$ are edged cutters composed of diamonds fitted and set firmly into suitable notches or mortises in the face of the crown or stock A. These diamonds are such as from their color are least valuable for jewelry. They are respectively so arranged in the crown or stock A that the cutting-edges of some project in a forward direction from the face or front end of the said crown or stock, as illustrated by $a$ $a$, while the edges of others project outwardly from the outer periphery thereof, as illustrated by $a'$ $a'$, and the edges of others project inwardly from the inner periphery, as illustrated by $a^2$ $a^2$. This crown or stock is secured by a bayonet-fastening or other means to a tubular boring-bar of any suitable length, whose outer diameter is not greater than that of the said crown or stock, and whose inner diameter is not less than that of the said crown or stock, and this bar is arranged to form part of a machine of suitable construction or otherwise furnished with suitable mechanical appliances, according to the nature of the work to be performed, by which it has imparted to it both a rotary and a direct forward or feeding motion, whereby it is caused to cut or bore an annular groove or hole in the rock or other hard body upon which it is employed.

The operation of the tool will be greatly assisted by the injection of a stream of water through the tubular boring-bar and crown or stock, for the purpose of washing out and carrying away the detritus which is produced, and which would otherwise choke up the annular opening and impede the action of the tool. This stream may be thrown in by a pump connected by a hose with the outer or rear end of the tubular boring-bar or by any other suitable and convenient means. When the boring has been continued to a desirable depth, the bar, with the attached tool, is drawn out from the hole, and the cylindrical kernel or core which has been left, and which, as the boring operation has proceeded, has passed through the socket or stock and into the tubular bar, is broken away by driving wedges or gads into the annular hole, and then pulled out, leaving a cylindrical hole of a diameter equal to the circle described by the revolution of the edges of the diamond cutter $a'$ $a'$.

The same kind of tool made of suitable caliber may be used for the production of solid cylinders of stone or other hard substances, as well as for boring, the solid cylinder being formed in the same way as the kernel or core above described with reference to the boring operation.

What I claim as my invention, and desire to secure by Letters Patent, is—

The tool for boring or cutting rock or other hard substances, composed of an annular or tubular stock or crown armed with a series of diamonds, and operating substantially as herein specified.

RODOLPHE LESCHOT.

Witnesses:
JAMES W. BROOKS,
E. SHERMAN GOULD.